United States Patent [19]

Peter

[11] Patent Number: 4,460,206

[45] Date of Patent: Jul. 17, 1984

[54] BUMPER FOR VEHICLES, PARTICULARLY MOTOR VEHICLES

[75] Inventor: Dietmar Peter, Hemmingen, Fed. Rep. of Germany

[73] Assignee: Dr. Ing. H.C.F. Porsche Aktiengesellschaft, Stuttgart, Fed. Rep. of Germany

[21] Appl. No.: 313,328

[22] Filed: Oct. 20, 1981

[30] Foreign Application Priority Data

Oct. 28, 1980 [DE] Fed. Rep. of Germany ....... 3040502

[51] Int. Cl.$^3$ ............................................. B60R 19/02
[52] U.S. Cl. ................................... 293/132; 293/155; 293/120; 403/379
[58] Field of Search ................................ 293/120–122, 293/130–136, 138, 139, 143, 150, 152, 153, 155; 403/361, 363, 378, 379

[56] References Cited

U.S. PATENT DOCUMENTS

| | | | |
|---|---|---|---|
| 3,795,418 | 3/1974 | Barényi | 293/136 |
| 3,840,260 | 10/1974 | Wacker et al. | 293/132 |
| 3,847,428 | 11/1974 | Uebelstädt | 293/132 |
| 4,061,386 | 12/1977 | Chupick | 293/134 |

FOREIGN PATENT DOCUMENTS 2316220 10/1974 Fed. Rep. of Germany ...... 293/120

Primary Examiner—Robert B. Reeves
Assistant Examiner—Dennis H. Pedder
Attorney, Agent, or Firm—Craig & Burns

[57] ABSTRACT

A bumper for vehicles, in particular automobiles, having a beam and dampers secured to the beam by means of retention devices in a manner so as to eliminate the use of auxiliary attachment devices, such as washers, cotter pins, etc., in order to prevent dislodgment of a bolt securing each retention device to the beam. In accordance with the preferred embodiments, each retention device and damper is provided with a bore. Within this bore a bolt is inserted that extends from an upper portion of the retention device, through the damper into a lower portion of the retention device. The bolt is retained in this bore either exclusively by bumper flanges overlying the opposite ends of the bore, or by the use of only one such flange and a blind bore having a check wall in the lower portion of the retention device.

8 Claims, 4 Drawing Figures

BUMPER FOR VEHICLES, PARTICULARLY MOTOR VEHICLES

BACKGROUND AND SUMMARY OF THE INVENTION

The invention pertains to a bumper for vehicles, in particular automobiles, with a beam and dampers which are secured to the beam by means of retention devices, each retention device being secured, on the one hand, to a vertical wall section of the beam and, on the other, to a respective damper by means of a bolt.

This type of bumper arrangement is known and disclosed, for example, in DE-AS (German Examined Application) No. 21 24 427. A disadvantage of this type of arrangement is that the bolt to connect the damper with the retention device must be secured at both ends by auxiliary attachment devices such as washers, cotter pins, etc., in order to prevent axial displacement. In addition, the installation of the attachment devices takes a relatively long time.

Another disadvantage is that the retention device between the damper and the beam makes contact only with the vertical wall section of the retention device at a parallel wall section of the beam; thus, when the bumper is compressed eccentrically, proper direction of force into the retention device, damper and structure is impaired.

A principal object of the invention is, therefore, to create a bumper with a beam, retention device and damper, that is simple to install and that the forces which arise at the bumper are properly directed via the support and the retention device into the damper.

In accordance with a preferred embodiment, this object is achieved by having the retention device feature guide sections which cooperate with the insides of flanges of the beam. Another feature is having the bolts held in position solely by the flanges of the beam and/or a check wall of the retention device.

The guide sections are located at flanges of the retention devices which form a hollow inner space designed as a receiver for the damper. The guide sections and the receivers of the damper, in one embodiment, are formed by separate flanges. The check wall is formed by a blind bore in one of the flanges.

A principal advantage of the present invention is that, because of the cooperation of the guide sections of the retention device and the flanges of the support, the stresses which arise at the bumper are directed efficiently via the beam and the retention device into the damper. In addition, because of the shape of the retention device and the beam, there is no need for additional attachment devices such as washers, cotter pins, etc., for the bolt since the bolt is held in position by either the flanges of the beam or a check wall of the retention device. This ensures simple installation of the damper of the retention device and the beam.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
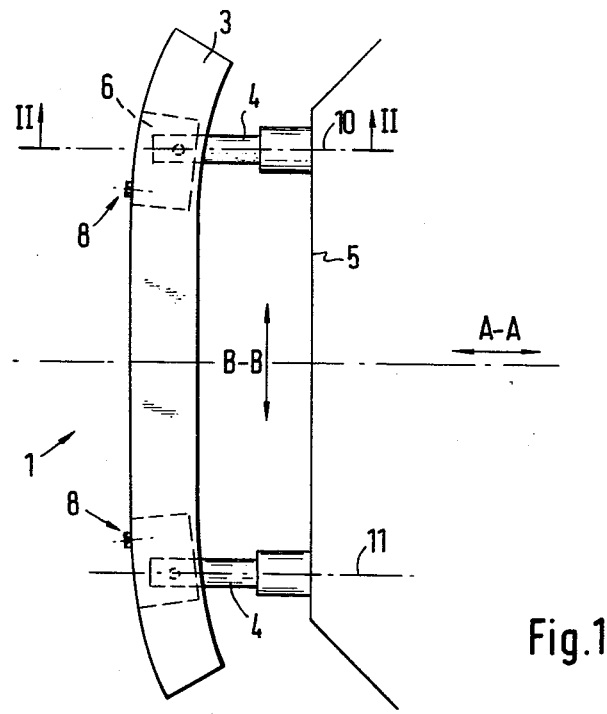
FIG. 1 shows a top view of a schematic bumper arrangement without covering.
Figure 2:
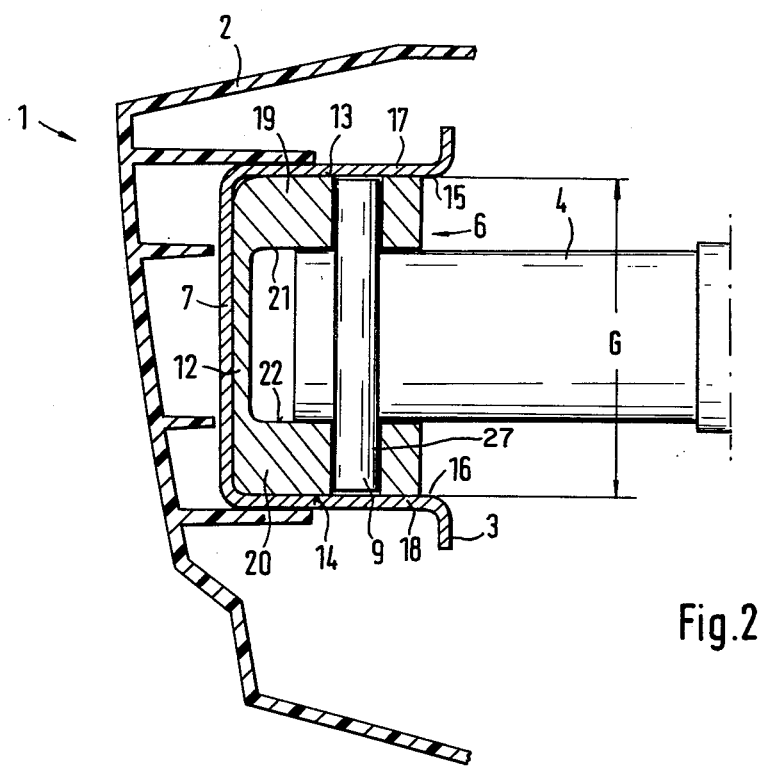
FIG. 2 shows a section along the Line II—II in FIG. 1 on an enlarged scale.

FIGS. 1 and 2 show a bumper 1, which comprises a covering 2, consisting of an elastic foam, and a beam 3 which is dimensionally stable and has considerable flexural strength. The beam 3 extends transverse to the longitudinal direction of the vehicle A—A and is supported by two dampers 4 mounted outside of the middle longitudinal plane of the vehicle; these dampers are secured at the body 5. The beam 3 has a vertical wall section 7.

Between each damper 4 and beam 3 is a retention device 6 which is secured, on the one hand, at a vertical wall section 7 of the beam 3 by means of detachable attachment devices (bolt and nut fasteners illustrated) 8 and, on the other hand, is connected with a respective damper 4 by means of a bolt 9. Retention device 6 has a vertical wall section 12 which cooperates with the vertical wall section 7 of the beam 3. Retention device 6 is secured to beam 3 (viewed in the transverse direction of the vehicle B—B) inside the two damper center lines 10, 11 (thus, the fastening nut of devices 8 is accessible internally of retention devices 6). As shown in FIG. 1, the retention device 6 has two hollow inner spaces, the sides of which act as a receiver for the damper 4. In addition to the vertical wall section 12, retention device 6 features generally horizontal guide sections 13, 14 which work together with the insides 15, 16 of flanges 17, 18 of beam 3 in order to provide support; in this case, retention device 16 is designed to slide easily into beam 3. It is also possible to design flanges 17, 18, as well as the corresponding guide sections 13, 14, in the shape of a V. Guide sections 13, 14 of retention device 6 are located at flanges 19, 20 as shown in FIG. 2; the insides 21, 22 of these guide sections are designed to receive damper 4.

Figure 3:
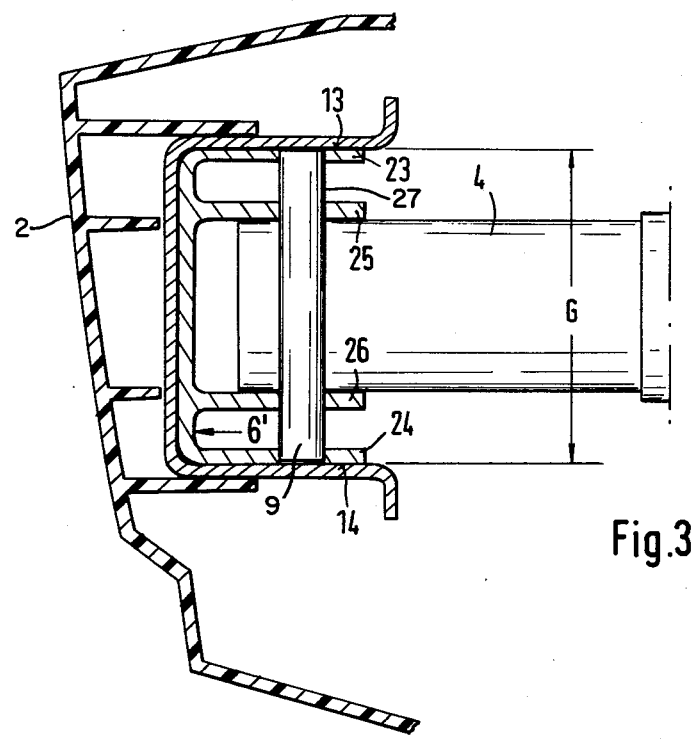
FIG. 3 shows a section corresponding to another embodiment.

The embodiment of FIG. 3 differs from that of FIGS. 1 and 2 only in that separate flanges 23, 24, 25, 26 are utilized instead of the thicker, solid flanges 19, 20. This advantageous feature reduces the weight of retention device 6'.

The hole 27 to receive bolt 9 extends, as shown in FIGS. 2 and 3, both within damper 4 and over the entire height G of the corresponding flanges 19, 20 or 23, 24, 26, 26 of retention device 6'. In the case of both of these embodiments, the bolt, which is loosely inserted into hole 27 (so that it can slide), is kept in position solely by flanges 17 and 18 of beam 3, i.e., without additional attachment devices.

Figure 4:
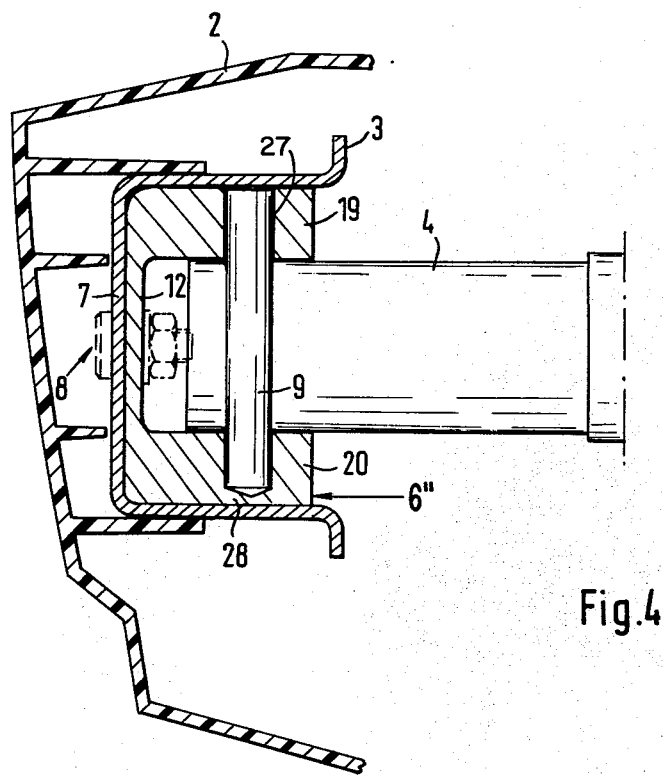
FIG. 4 shows a section in accordance with still another embodiment.

According to a further advantageous embodiment, a retention device 6'', as shown in FIG. 4, is utilized. In this embodiment the bolt 9 is kept in position by a check wall 28 of a blind bore in flange 20 and, thus, cannot fall out (opposite the direction of introduction) during installation.

In accordance with all of the noted embodiments, the bumper is installed in the following manner. The retention devices, 6' or 6'' are placed on dampers 4, which are secured at body 5, and are secured into position by bolts 9. Then, beam 3 is pushed forward onto retention devices, 6' or 6'' and connected with them at the vertical wall section 7 of the beam 3 and the vertical wall section 12 of the retention device 6 by means of attachment devices 8. Finally, the covering 2 is secured to beam 3 by means of appropriate attachment devices such as clips, screws, etc.

While I have shown and described various embodiments in accordance with the present invention, it is understood that the same is not limited thereto, but is susceptible of numerous changes and modifications as known to those skilled in the art and I, therefore, do not wish to be limited to the details shown and described herein, but intend to cover all such changes and modifications as are encompassed by the scope of the appended claims.

I claim:

1. A bumper for vehicles comprising, a beam and dampers which are secured to the beam by means of retention devices; said beam having flanges and said retention devices having guide sections; each retention device being secured at a vertical section of the beam and being connected to a respective damper by means of a bolt occupying a bore in the guide sections of the retention device, the guide sections having surfaces contacting inside surfaces of the flanges of the beam and the damper, the bolt having a height less than the distance between the flanges of the beam and being disposed solely between the flanges of the beam.

2. The bumper in accordance with claim 1, wherein the retention device has a hollow inner space, the insides of which being designed as a receiver for the damper.

3. The bumper in accordance with claim 2, wherein the guide sections and the receiver of the damper being formed by separate flanges of the retention device.

4. The bumper in accordance with claim 1 wherein the guide sections of the retention device and said damper being provided with a bore, said bolt being inserted into the bore so as to extend from an upper one of the guide sections through said damper into a lower one of the guide sections, and said bolt is retained in said bore at at least one end by an inner surface of one of the flanges of the beam.

5. The bumper in accordance with claim 4, wherein said bolt being retained in said bore at both ends by an inner surface of a respective flange of the beam.

6. The bumper in accordance with claim 4, wherein said bore being formed in a lower one of the guide sections of the retention device as a blind bore having a check wall for retaining said bolt with the bore, the inner surface of the beam retaining the bolt in the bore only at the upper end thereof.

7. The bumper in accordance with claim 1, wherein the vehicle is an automobile.

8. The bumper in accordance with claim 1, wherein the guide section is solid.

* * * * *